US010062987B2

(12) United States Patent
Chen

(10) Patent No.: US 10,062,987 B2
(45) Date of Patent: Aug. 28, 2018

(54) CARD CONNECTOR CONTACT HAVING A FRAME PORTION AND A CURVED PORTION ANCHORED TO OPPOSITE FRONT AND REAR OF THE FRAME PORTION

(71) Applicant: FOXCONN INTERCONNECT TECHNOLOGY LIMITED, Grand Cayman (KY)

(72) Inventor: Chin-Yu Chen, New Taipei (TW)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 15/787,655

(22) Filed: Oct. 18, 2017

(65) Prior Publication Data

US 2018/0109019 A1 Apr. 19, 2018

(30) Foreign Application Priority Data

Oct. 19, 2016 (CN) ...................... 2016 2 1136385 U

(51) Int. Cl.
*H01R 12/71* (2011.01)
*H01R 12/50* (2011.01)
*H01R 13/42* (2006.01)
*G06K 13/08* (2006.01)
*H01R 12/00* (2006.01)

(52) U.S. Cl.
CPC .......... *H01R 12/714* (2013.01); *G06K 13/08* (2013.01); *H01R 9/09* (2013.01); *H01R 13/42* (2013.01); *H01R 23/70* (2013.01)

(58) Field of Classification Search
CPC ...... H01R 31/06; H01R 31/08; H01R 12/714; G06K 13/08
USPC ................................... 439/630, 59, 638, 639
See application file for complete search history.

(56) References Cited

U.S. PATENT DOCUMENTS

| 6,328,573 B1 | 12/2001 | Hirose |
| 7,371,079 B2 * | 5/2008 | Yang .................... G06K 7/0021 439/630 |

(Continued)

FOREIGN PATENT DOCUMENTS

| CN | 204088670 | 1/2015 |
| CN | 105337071 | 2/2016 |

(Continued)

*Primary Examiner* — Harshad C Patel
(74) *Attorney, Agent, or Firm* — Wei Te Chung; Ming Chieh Chang

(57) ABSTRACT

A card connector includes: an insulative housing (2) for receiving a card tray inserted in a front-to-back direction; and plural contacts (31) secured to the insulative housing, each contact including a frame portion (311), a curved portion connected inside the frame portion, and a tail portion (312) connected outside the frame portion, the curved portion including a first anchoring portion (315) and a second anchoring portion (315) respectively connected to the frame portion, a first arm (313) and a second arm (314) respectively continuing the first and second anchoring portions, a front connecting portion (317) and a rear connecting portion (318) respectively connected to the first and second arms, and a contacting portion (316) connected between the front and rear connecting portions.

19 Claims, 10 Drawing Sheets

(56) References Cited

U.S. PATENT DOCUMENTS

| | | | |
|---|---|---|---|
| 7,635,276 B1* | 12/2009 | Chu | H01R 13/2442 |
| | | | 439/326 |
| 8,292,642 B1* | 10/2012 | Lee | G06K 7/0026 |
| | | | 439/159 |
| 8,864,524 B2 | 10/2014 | Sato | |
| 9,275,260 B2* | 3/2016 | Soo | G06K 7/0021 |
| 9,378,436 B2* | 6/2016 | Wang | G06K 13/08 |
| 9,576,225 B2* | 2/2017 | Zhang | G06K 13/0831 |
| 2010/0144179 A1* | 6/2010 | Guo | G06K 7/0073 |
| | | | 439/159 |
| 2016/0006158 A1 | 1/2016 | Lu et al. | |

FOREIGN PATENT DOCUMENTS

| | | |
|---|---|---|
| CN | 105514645 | 4/2016 |
| TW | M480784 | 6/2014 |

\* cited by examiner

CARD CONNECTOR CONTACT HAVING A FRAME PORTION AND A CURVED PORTION ANCHORED TO OPPOSITE FRONT AND REAR OF THE FRAME PORTION

BACKGROUND OF THE INVENTION

1. Field of the Invention

The present invention relates to a card connector with a simplified contact of the type having a curved portion with a contacting portion and two flexible portions integrally formed at two opposite ends of the contacting portion.

2. Description of Related Art

U.S. Patent Application Publication No. 2016/0006158, published on Jun. 7, 2016, discloses a card connector comprising an insulative housing for receiving a card inserted in a front-to-back direction and a plurality of contacts secured to the insulative housing. Each contact includes a retaining portion, a curved portion connected to the retaining portion, and a tail portion also connected to the retaining portion, the curved portion having a contacting portion and two flexible portions integrally formed at two opposite ends of the contacting portion. The curved portion may be Z-shaped (without corner portions) or S-shaped (with corner portions). In another embodiment, with an oblique contacting portion as viewed along a card mating direction, the contact may be arranged by generally turning it about 90 degrees.

SUMMARY OF THE INVENTION

A card connector comprises: an insulative housing for receiving a card tray inserted in a front-to-back direction; and a plurality of contacts secured to the insulative housing, each contact including a frame portion, a curved portion connected inside the frame portion, and a tail portion connected outside the frame portion, the curved portion including a first anchoring portion and a second anchoring portion respectively connected to the frame portion, a first arm and a second arm respectively continuing the first and second anchoring portions, a front connecting portion and a rear connecting portion respectively connected to the first and second arms, and a contacting portion connected between the front and rear connecting portions; wherein the first anchoring portion is connected to a rear of the frame portion and the second anchoring portion is connected to a front of the frame portion; and the front connecting portion is connected between a front of the first arm and a front of the contacting portion and the rear connecting portion is connected between a rear of the second arm and a rear of the contacting portion.

DETAILED DESCRIPTION OF THE PREFERRED EMBODIMENT

Figure 1:
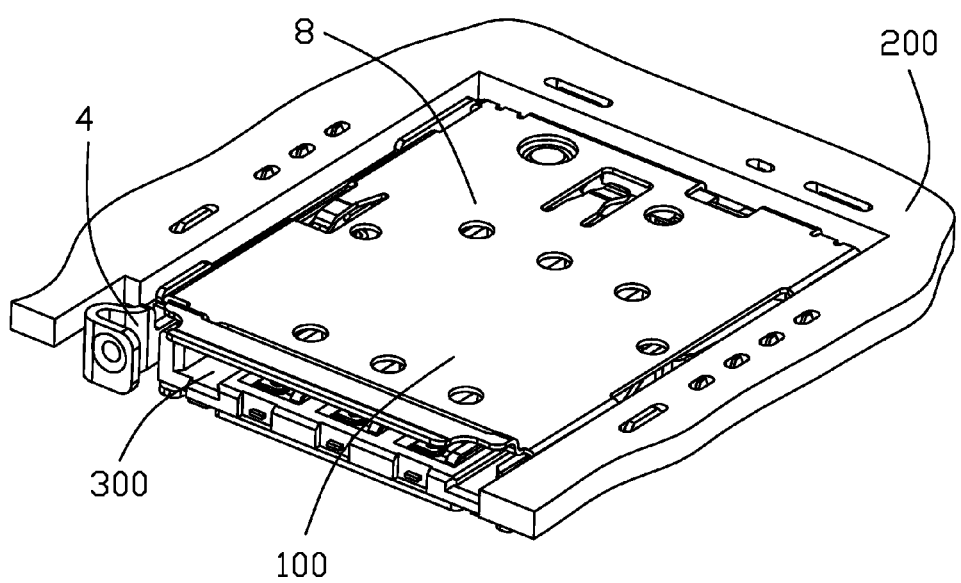
FIG. 1 is a perspective view of a card connector mounted on a printed circuit board.
Figure 2:
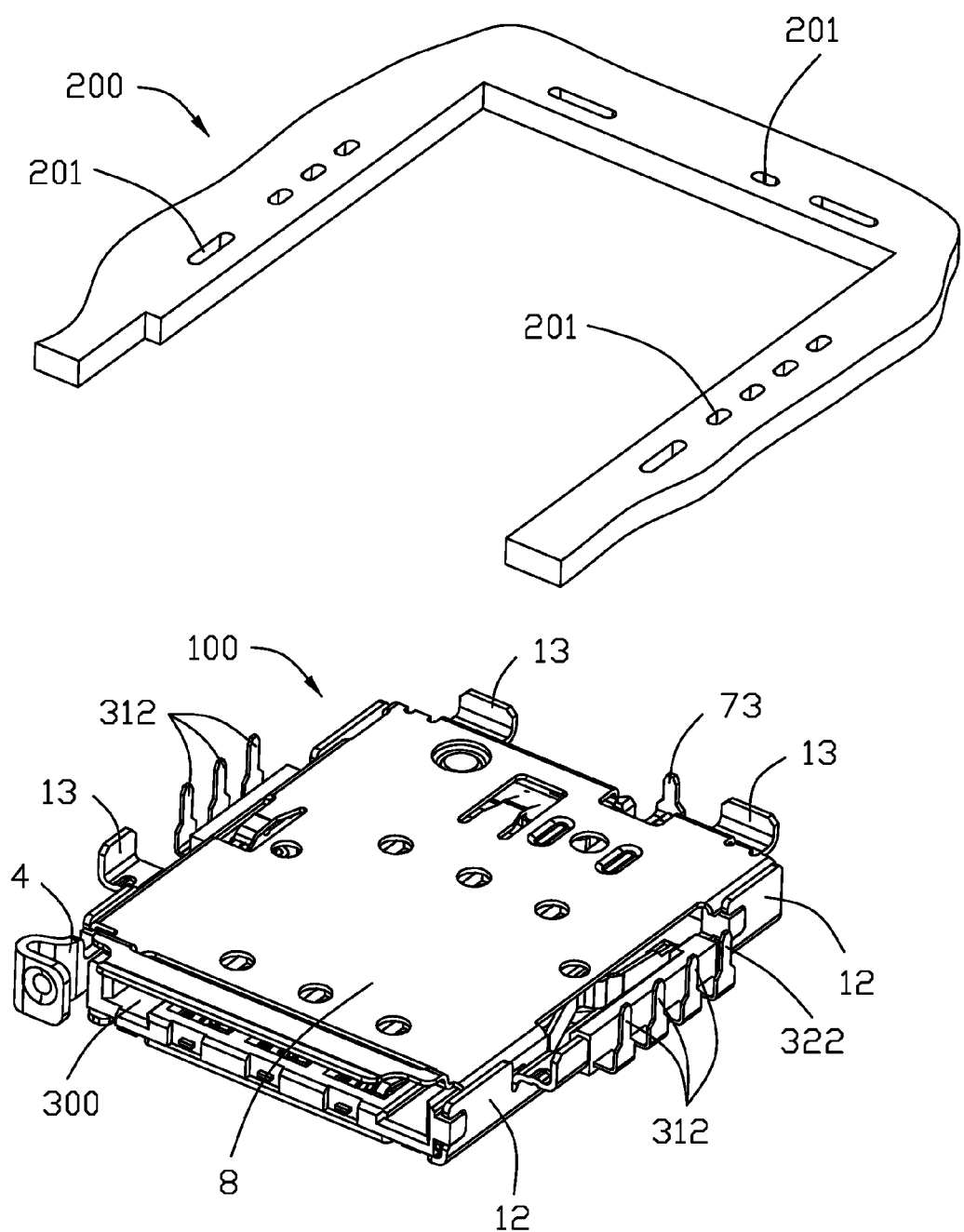
FIG. 2 is a perspective view showing the card connector not mounted on a printed circuit board.
Figure 3:
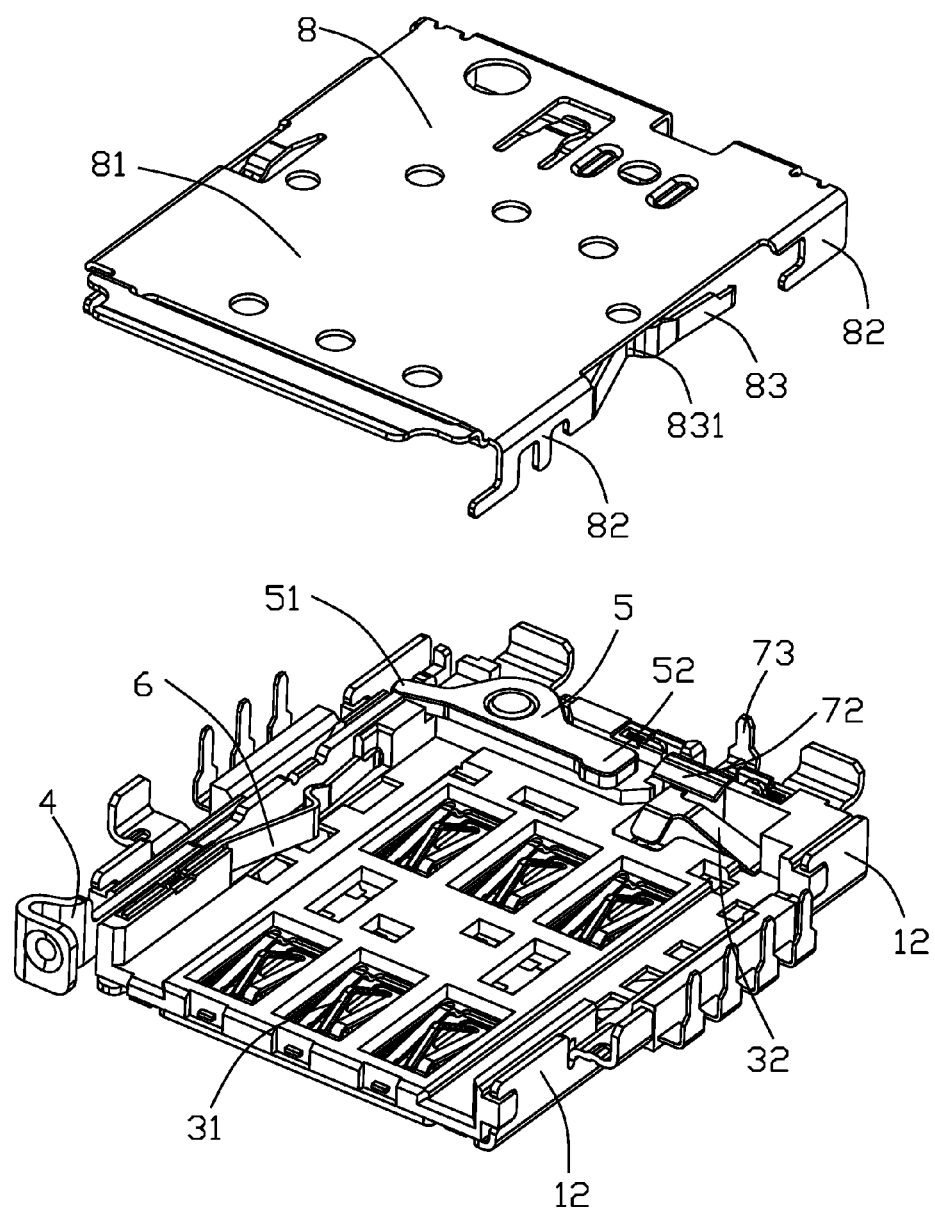
FIG. 3 is a partly exploded view of the card connector.
Figure 4:
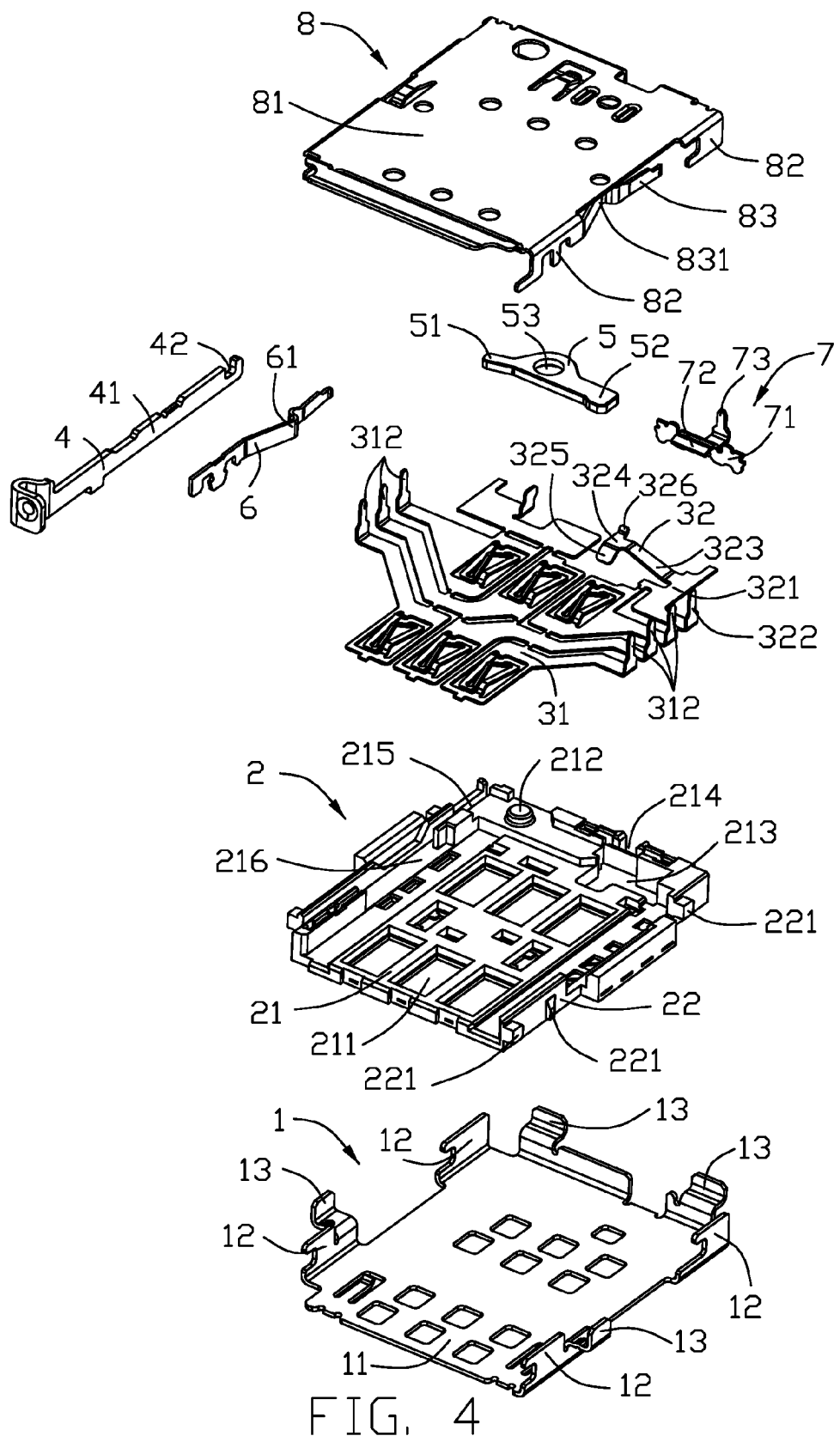
FIG. 4 is a further exploded view of the card connector.
Figure 5:
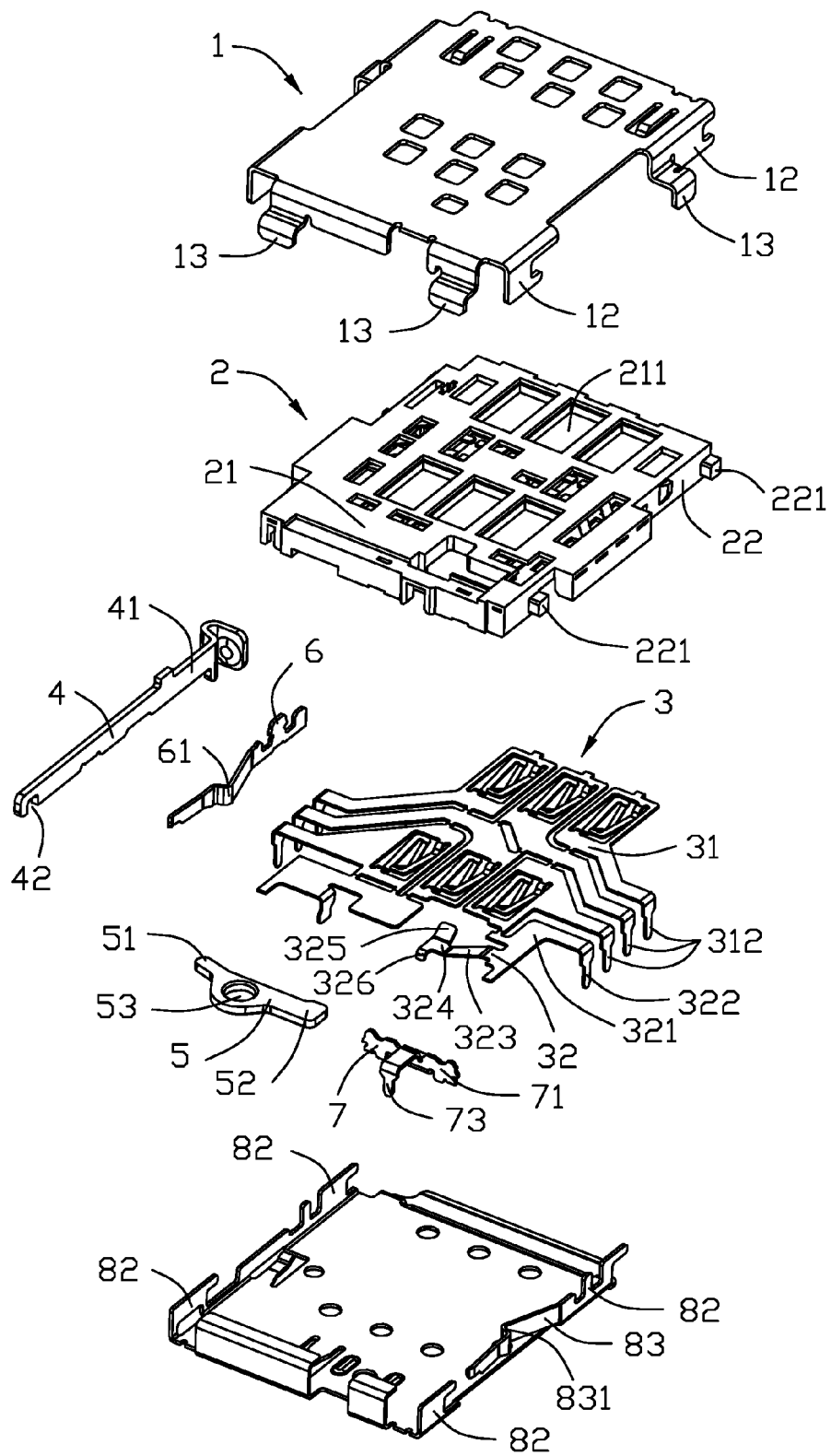
FIG. 5 is view similar to FIG. 4 but from a different perspective.
Figure 6:
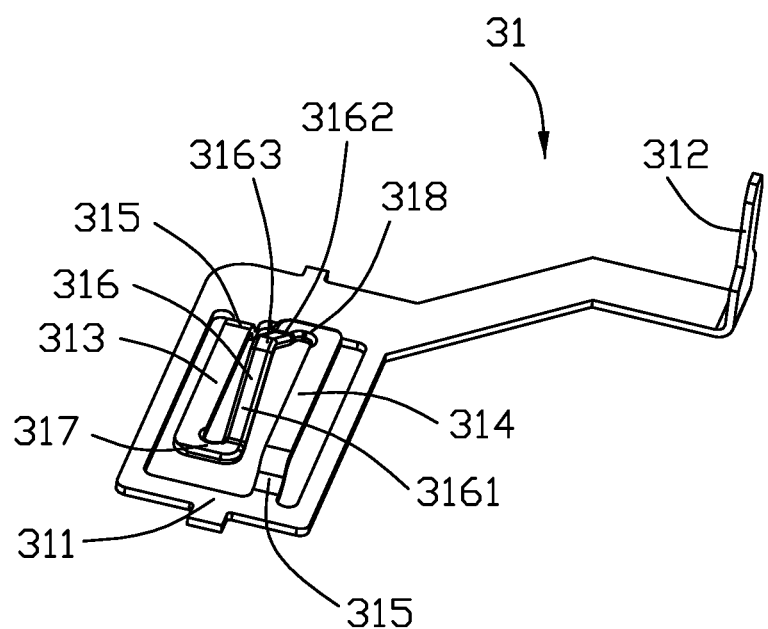
FIG. 6 is a perspective view of a contact of the card connector.

Referring to FIGS. 1-6, a card tray or card connector 100 for mounting to a printed circuit board (PCB) 200 has a receiving space 300 for inserting a card tray 400 in a front-to-back direction and includes an insulative housing 2 and a terminal set 3 secured to the insulative housing. The card connector 100 may further include a metal chassis 1, a card-ejecting mechanism, a positioning piece 6, a stationary contact 7, and a cover 8.

The metal chassis 1 includes a base 11, plural side catches 12, and plural side and rear legs 13.

The insulative housing 2 includes a base 21 and two side walls 22. The base 21 has plural openings 211, a post 212, a slot 213, a groove 214, a slit 215, and a receiving room 216. The side walls 22 have plural securing protrusions 221.

The terminal set 3 includes a plurality of contacts 31 and a movable contact 32. Each contact 31 includes a frame portion 311, a curved portion connected inside the frame portion 311, and a tail portion 312 connected outside the frame portion 311. The curved portion includes a first and second anchoring portions 315 respectively connected to the frame portion 311, a first arm 313 and a second arm 314 respectively continuing the first and second anchoring portions 315, a front connecting portion 317 and a rear connecting portion 318 respectively connected to the first and second arms 313 and 314, and a contacting portion 316 connected between the front and rear connecting portions 317 and 318. The contacting portion 316 extends in the extending/front-to-back direction and has a first ramp 3161, a second ramp 3162, and an apex 3163 at the junction of the first and second ramps. The front connecting portion 317 connects the first arm 313 to the first ramp 3161 and the rear connecting portion 318 connects the second arm 314 to the second ramp 3162. The first and second arms 313 and 314 extend in the front-to-back direction and are parallel to each other and are located by and spaced from two sides of the contacting portion 316 in the transverse direction perpendicular to the front-to-back direction. The front and rear connecting portions 317 and 318 generally extend in a left-to-right direction and are parallel to each other. The first and second anchoring portions 315 generally extend in the front-to-back direction obliquely and upwardly so as to raise up the corresponding first arm 313 and second arm 314. The movable contact 32 includes a main portion 321, a first soldering portion 322, a spring arm 323, a body 324, a pressing portion 325, and a contacting portion 326. The plurality of contacts 31 and the movable contact 32 of the terminal set 3 are insert molded with the insulative housing 2. The contact 31 is exposed to the opening 211. The frame portion 311 is embedded in the base 21 between its upper and lower surfaces thereof. The first arm 313 and the front connecting portion 317 are on same plane and also located between the upper and lower surfaces of the base 21, so are the second arm 314 and the rear connecting portion 318. The tail portion 312 extends sidewardly out of the base 21. During insertion or ejection of the card tray 400, therefore, the contacts 31 will not be subject to damage by the card tray 400. The movable contact 32 is exposed to the slot 213.

The card-ejecting mechanism includes a push rod 4 and a pivot 5 coupled to the push rod. The push rod 4 has a rod portion 41 and a notch 42 at a front end of the rod portion. The pivot 5 has a head 51, a tail 52, and a hole 53. The push rod 4 is disposed in the slit 215. The hole 53 of the pivot 5 engages the post 212 of the insulative housing 2 and the head 51 is received in the notch 42 of the push rod 4.

The positioning piece 6 has a curved portion 61 and is disposed in the receiving room 216.

The stationary contact 7 has a securing portion 71, a contacting portion 72, and a soldering portion 73 and is secured to the groove 214. The contacting portion 326 of the movable contact 32 is normally in touch with the contacting portion 72 of the stationary contact 7. When the card tray 400 is inserted to move the pressing portion 325 of the movable contact 32, the contacting portion 326 disengages the contacting portion 72.

The cover 8 has a main body 81, plural hooks 82 at two opposite sides of the main body, and a positioning portion 83. The positioning portion 83 has a curved portion 831.

The cover 8 is mounted from a top to the insulative housing 2 by engaging the hooks 82 with the protrusions 221 and the chassis 1 is mounted from a bottom to the insulative housing 2 by engaging the catches 12, from outer sides of the hooks 82, with the protrusions 221.

The PCB 200 has plural soldering holes 201 for receiving the tail portions 312 of the contacts 31, the first soldering portion 322 of the movable contact 32, the soldering portion 73 of the stationary contact 7, and the legs 13 of the metal chassis, respectively.

Figure 7:
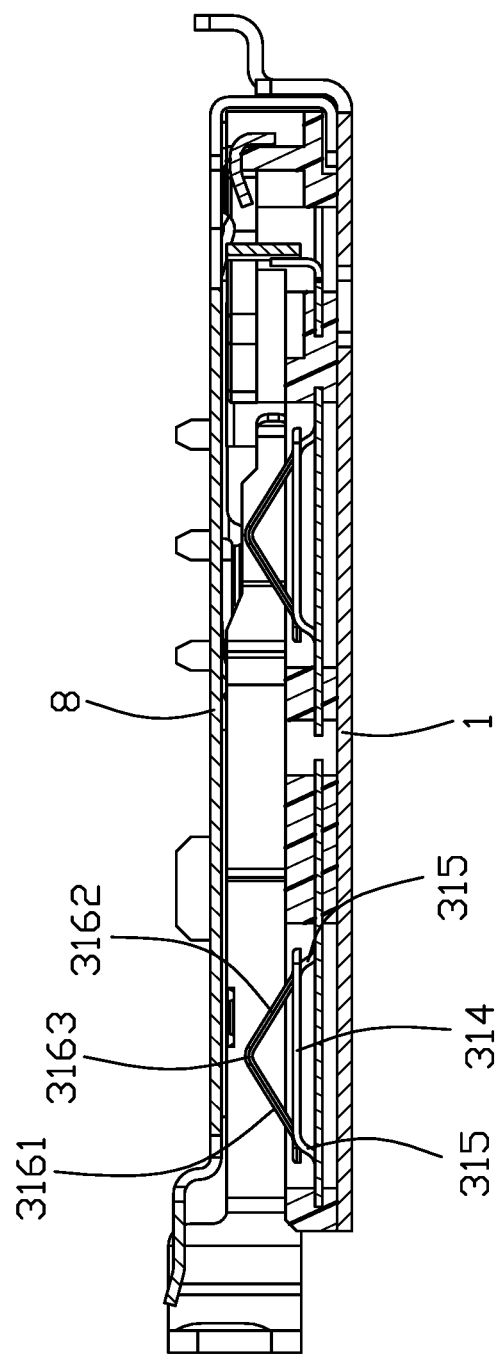
FIG. 7 is a cross-sectional view of the card connector before inserting a card tray.
Figure 8:
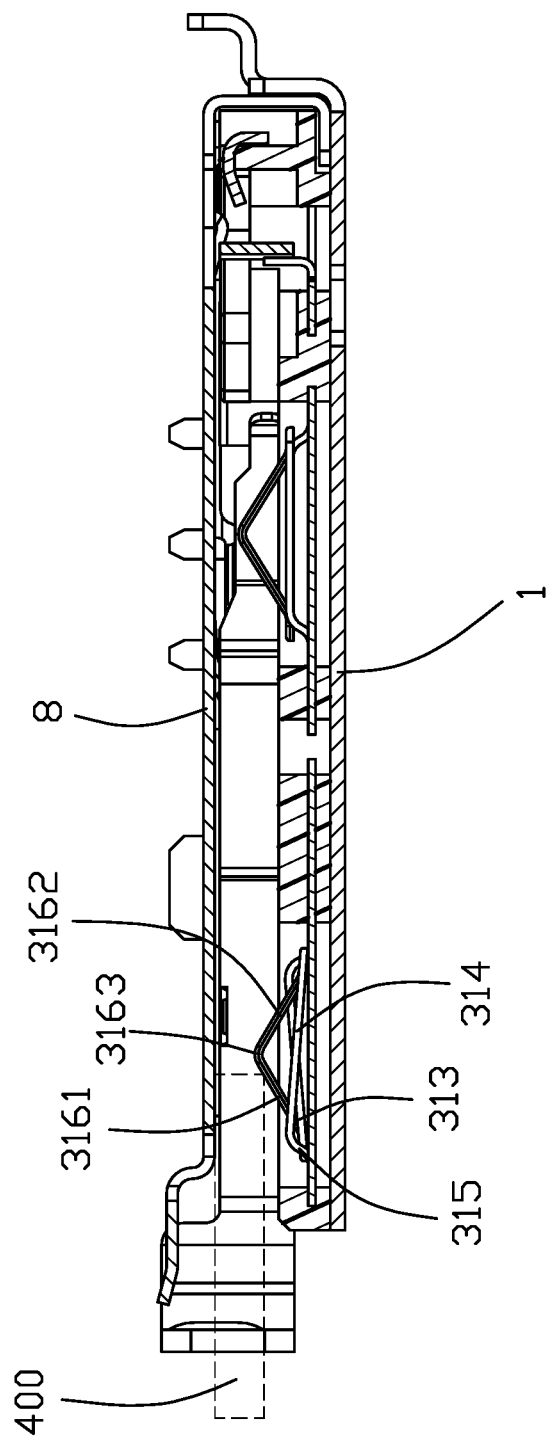
FIG. 8 is a cross-sectional view of the card connector when a card tray is inserted.

Referring to FIGS. 7 and 8, the inserted card tray 400 presses the first ramp 3161 of the contacting portion 316, thus moving the front connecting portion 317 and the first arm 313 downward. At the same time, the second ramp 3162 is moved by the first ramp 3161 to in turn move the rear connecting portion 318 and the second arm 314 downward.

Figure 9:
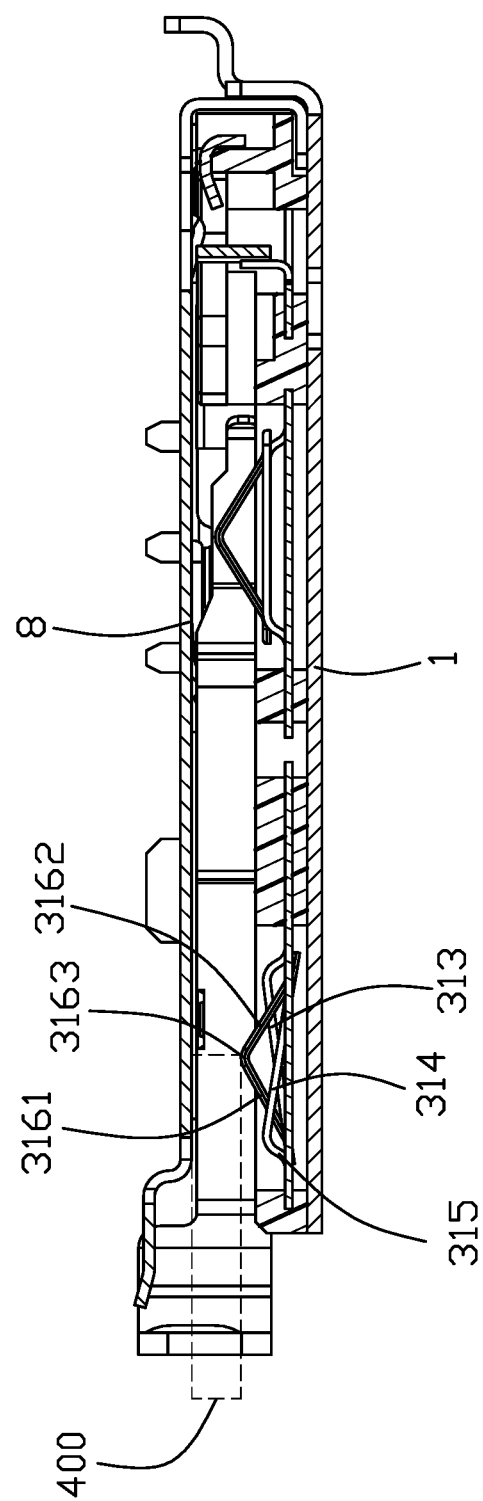
FIG. 9 is a cross-sectional view of the card connector when the card tray is further inserted.

Referring to FIG. 9, continuing insertion of the card tray 400 moves the front connecting portion 317 and the first arm 313, as well as the rear connecting portion 318 and the second arm 314, further downward. When the card tray 400 touches the apex 3163, the second arm 314 is inclined more than the first arm 313 and the rear connecting portion 318 is leveled lower than the front connecting portion 317.

Figure 10:
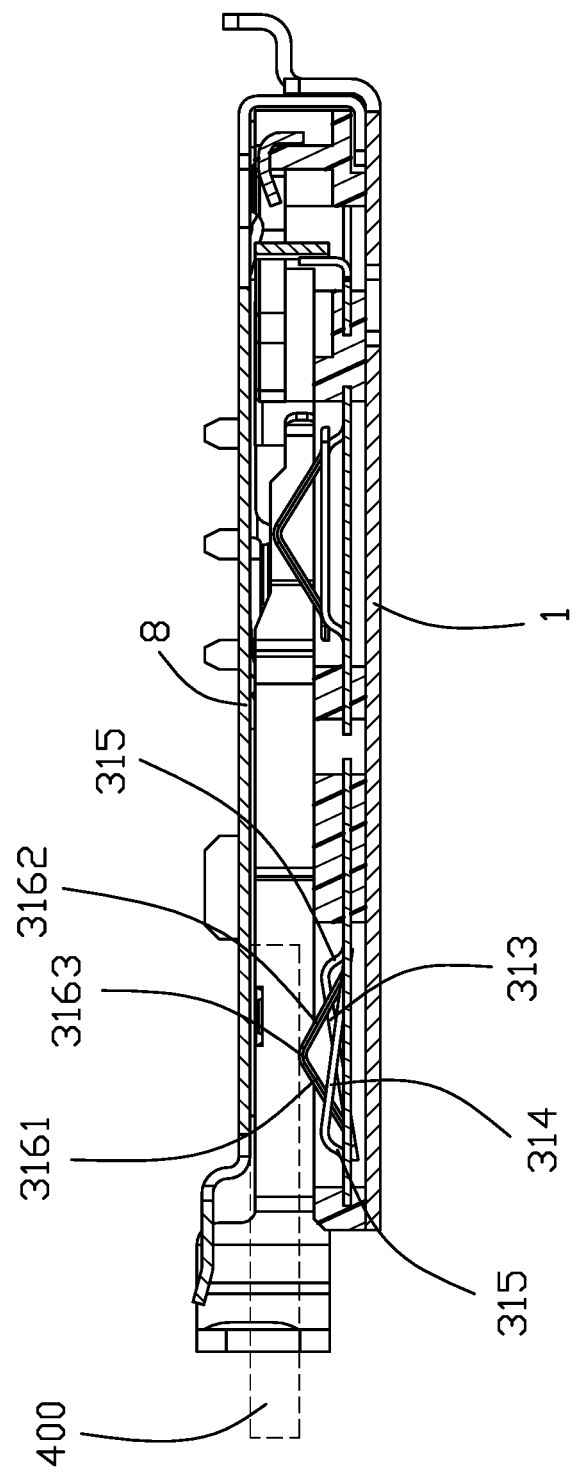
FIG. 10 is a cross-sectional view of the card connector when the card tray is retracted.

Referring to FIG. 10, during ejecting the card tray 400, a larger pressing force is applied to the first ramp 3161 of the contacting portion 316 so that the first arm 313 is inclined more than the second arm 314 while the front connecting portion 317 is leveled lower than the rear connecting portion 318.

One feature of the invention is to provide the upwardly/obliquely extending anchoring portion 315 for lifting up the corresponding first arm 313 and second arm 314 so as to prevent the front connecting portion 317 and the rear connecting portion 318 from improperly touching the base 11 of the metal chassis 1 when the card tray 400 with the corresponding card is received within the receiving space 300 and the contacting portion 316 is deflected toward the base 11. In this embodiment, the distance between the first/second arm 314/315 and the frame 311 in the vertical direction is essentially not less than that between the base 11 and the frame 311 for assuring no touching between the front/rear connecting portion 317/318 and the base 311 when the card tray 400 with the card is received in the receiving space 300.

Another attribute for this assurance is that he contacting portion 316, the first arm 313 and the second arm 314 including the corresponding anchoring portion 315 extend along the front-to-back direction to comply with the card tray insertion/withdrawal direction wherein the anchoring portion 315. In this embodiment, in the top view the length of the first/second arm 313/314 and the contacting portion 316 are close/similar to the dimension of the frame 311 in the front-to-back direction. In brief, in the contact 31, the moveable part including the two anchoring portions 315, the first/second arm 313/314, the front/rear connecting portion 317/318 and the contacting portion 316, is essentially deemed as an S-shaped configuration or an upstanding U-shaped configuration and an upside-down U-shaped configuration joined together wherein the first/second arm 313/314 of the such a movable essentially, which is already lifted up by the corresponding anchoring portion 315, extends at most along the front-to-back direction so as to obtain the desired flexibility without the potential shorting risk with regard to the base 11.

What is claimed is:

1. A card connector comprising:
an insulative housing for receiving a card tray inserted in a front-to-back direction; and
a plurality of contacts secured to the insulative housing, each contact including a frame portion, a curved portion connected inside the frame portion, and a tail portion connected outside the frame portion, the curved portion including a first anchoring portion and a second anchoring portion respectively connected to the frame portion, a first arm and a second arm respectively continuing the first and second anchoring portions, a front connecting portion and a rear connecting portion respectively connected to the first and second arms, and a contacting portion connected between the front and rear connecting portions; wherein
the first anchoring portion is connected to a rear of the frame portion and the second anchoring portion is connected to a front of the frame portion; and
the front connecting portion is connected between a front of the first arm and a front of the contacting portion and the rear connecting portion is connected between a rear of the second arm and a rear of the contacting portion.

2. The card connector as claimed in claim 1, wherein each of the first and second arms is substantially straight.

3. The card connector as claimed in claim 1, wherein each of the first and second arms extends along the front-to-back direction.

4. A card connector comprising:
an insulative housing defining a receiving space communicating with an exterior along a front-to-back direction, and a plurality of opening communicating with the receiving space in a vertical direction perpendicular to said front-to-back direction;
a plurality of contacts disposed in the housing, each of said contacts being of a unitary form and including:
a stationary frame portion surrounding the corresponding opening;
a vertically deflectable moveable part extending from the stationary frame portion and located within the stationary frame portion in a top view, and including:
a contacting portion extending along the front-to-back direction and including opposite first ramp and second ramp with therebetween an apex extending into the receiving space in the vertical direction;
a first arm extending along the front-to-back direction and connected to one end of the contacting portion, a second arm extending along the front-to-back direction and connected to the other end of the contacting portion, the first arm and the second arm being located by two sides of the contacting portion and spaced from one another in a transverse direction perpendicular to both said front-to-back direction and said vertical direction; wherein both said first arm and said second arm are raised vertically away from the frame toward the receiving space portion by means of two corresponding anchoring portions, respectively, which are linked between the frame portion and the corresponding first arm and second arm and extend upwardly in the vertical direction.

5. The card connector as claimed in claim 4, wherein said anchoring portions extend in the front-to-back direction.

6. The card connector as claimed in claim 4, wherein said anchoring portions are connected to opposite front and rear regions of the frame portion, respectively.

7. The card connector as claimed in claim 4, wherein the first arm is connected with the first ramp of the contacting portion via a first connecting portion extending along said transverse direction, and the second arm is connected with the second ramp of the contacting portion via a second connecting portion extending in the transverse direction.

8. The card connector as claimed in claim 4, wherein all said first arm, said second arm and said contacting portion extend with dimensions similar to that of the frame portion in the front-to-back direction.

9. The card connector as claimed in claim 4, wherein said first arm and said second arm extend horizontally and parallel to the frame portion when said contacting portion is not deflected away from the receiving space in the vertical direction while said first arm and said second arm extend obliquely away from the receiving space when the contacting portion is deflected away from the receiving space in the vertical direction.

10. The card connector as claimed in claim 4, wherein said movable part is essentially composed of an S-shaped configuration in said top view.

11. The card connector as claimed in claim 4, wherein in said top view, said movable part is essentially composed of an upstanding U-shaped configuration and an upside-down U-shaped configuration joined with each other wherein the contacting portion is located at a joint therebetween.

12. A card connector for use with a card tray, comprising:
an insulative housing defining a receiving space communicating with an exterior along a front-to-back direction for receiving said card tray, and a plurality of opening communicating with the receiving space in a vertical direction perpendicular to said front-to-back direction;
a plurality of contacts disposed in the housing, each of said contacts being of a unitary form and including:
a stationary frame portion surrounding the corresponding opening;
a vertically deflectable moveable part extending from the stationary frame portion and located within the stationary frame portion in a top view, and including:
a contacting portion extending along an extending direction in said top view and having opposite first ramp and second ramp with therebetween an apex extending into the receiving space in the vertical direction;
a first arm extending connected to one end of the contacting portion and parallel to said contacting portion in the top view, a second arm connected to the other end of the contacting portion and parallel to the contacting portion in the top view, the first arm and the second arm being located by and spaced from two sides of the contacting portion in a lateral direction perpendicular to said extending direction; wherein both said first arm and said second arm are raised vertically away from the frame portion toward the receiving space by means of two corresponding anchoring portions, respectively, which are linked between the frame portion and the corresponding first arm and second arm and extend upwardly in the vertical direction; wherein in said top view, said movable part is essentially composed of an upstanding U-shaped configuration and an upside-down U-shaped configuration joined with each other wherein the contacting portion is located at a joint therebetween.

13. The card connector as claimed in claim 12, wherein said anchoring portions extend in the extending direction.

14. The card connector as claimed in claim 12, wherein said anchoring portions are connected to opposite front and rear regions of the frame portion, respectively.

15. The card connector as claimed in claim 12, wherein the first arm is connected with the first ramp of the contacting portion via a first connecting portion extending along said lateral direction, and the second arm is connected with the second ramp of the contacting portion via a second connecting portion extending in the lateral direction.

16. The card connector as claimed in claim 15, wherein said first arm and said second arm extend horizontally and parallel to the frame portion when no card tray is received within the receiving space, said contacting portion is not deflected away from the receiving space in the vertical direction while said first arm and said second arm extend obliquely away from the receiving space when the card tray is received within the receiving space and the contacting portion is deflected away from the receiving space in the vertical direction.

17. The card connector as claimed in claim 16, wherein the first connecting portion and the second connecting portion are configured to be moved away from the receiving space and beyond the frame portion in the vertical direction when the contacting portion is deflected while not touching a metallic base attached upon an exterior surface of the housing opposite to said receiving space.

18. The card connector as claimed in claim 12, wherein all said first arm, said second arm and said contacting portion extend with dimensions similar to that of the frame portion in the front-to-back direction.

19. The card connector as claimed in claim 12, wherein said first arm and said second arm extend horizontally and parallel to the frame portion when said contacting portion is not deflected away from the receiving space in the vertical direction while said first arm and said second arm extend obliquely away from the receiving space when the contacting portion is deflected away from the receiving space in the vertical direction.

* * * * *